G. R. HOHMAN.
FAUCET.
APPLICATION FILED FEB. 25, 1908.
904,329.
Patented Nov. 17, 1908.
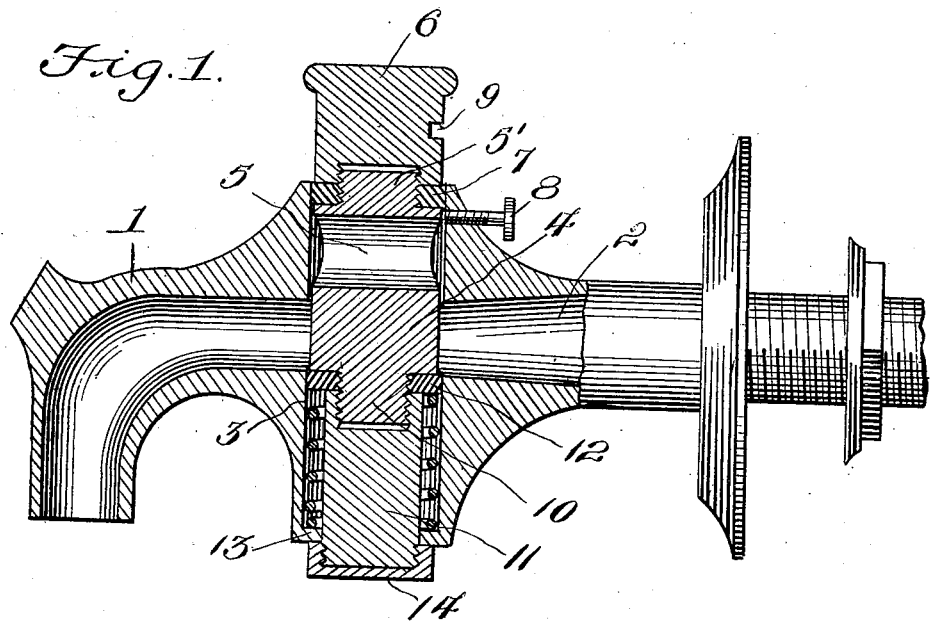
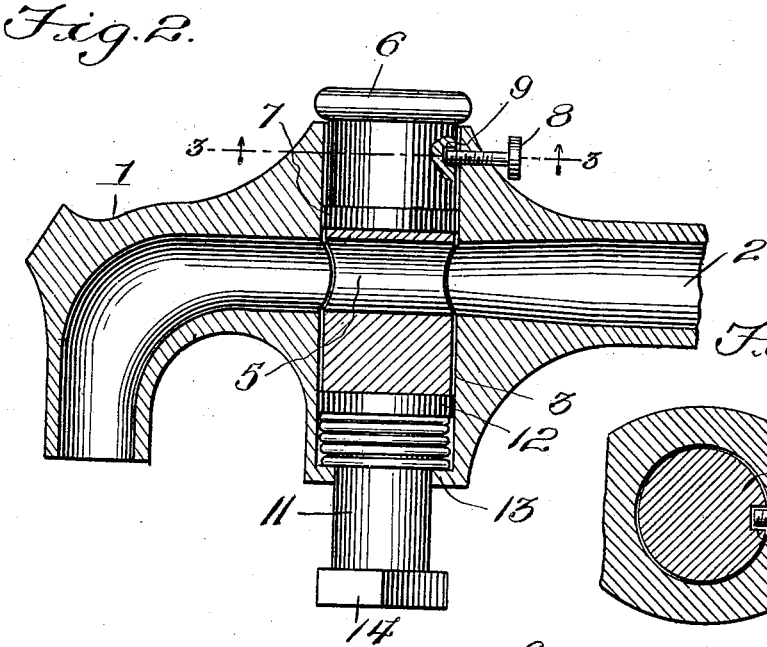
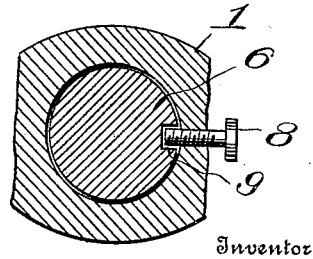
Witnesses
Inventor
George R. Hohman,
By Victor J. Evans,
Attorney

UNITED STATES PATENT OFFICE.

GEORGE R. HOHMAN, OF ROCHESTER, NEW YORK.

FAUCET.

No. 904,329.  Specification of Letters Patent.  Patented Nov. 17, 1908.

Application filed February 25, 1908. Serial No. 417,786.

*To all whom it may concern:*

Be it known that I, GEORGE R. HOHMAN, a citizen of the United States, residing at Rochester, in the county of Monroe and State of New York, have invented new and useful Improvements in Faucets, of which the following is a specification.

This invention relates to faucets of the self closing type, and the object of the invention is to provide a faucet primarily intended for vending beer or ale, one having its piston working within the chamber of the faucet provided with readily removable washers whereby the piston is tightly engaged within the chamber, and the parts being so constructed and arranged as to be readily removable to provide for the substitution of additional washers should the washers upon the piston become worn.

Another object of the invention is to provide a faucet having a spring pressed valve or piston, normally closing the faucet with means whereby the valve or piston may be retained in communicating with the ports or channels of the faucet to allow for the free outflow of liquid through the faucet.

With these and other objects in view the invention resides in the novel construction of faucets, hereinafter fully described and claimed.

In the drawings, Figure 1 is a central longitudinal sectional view of a faucet constructed in accordance with my invention, and illustrating the outlet passage closed. Fig. 2 is a similar view illustrating the outlet passage opened. Fig. 3 is a horizontal section upon the line 3—3 of Fig. 2.

In the accompanying drawings the numeral 1 designates a faucet provided with a longitudinally extending outlet port or passage 2. The body of the faucet 1 is provided with a vertical bore or chamber 3, arranged in transverse relation to, and communicating with the passage 4 near the central portion of the chamber 3.

Arranged within the chamber 3 is a slidable piston or valve 4, having a port 5, adapted, when the piston is forced downwardly to communicate with the passage 2 of the faucet. The piston 4 is provided upon its upper end with a reduced threaded extension 5', adapted for the reception of an operating head 6. The head 6 is of a cross sectional contour similar to, and of a size agreeing with the face of the piston 4, so as to provide an annular shoulder agreeing with the annular shoulder provided by the reduced extension 5' of the piston. Interposed between these shoulders is an annular washer 7, adapted for tight engagement within the bore of the chamber 3. The chamber 3 has one of its walls provided with a screw threaded aperture adapted for the reception of a threaded element 8, and the head 6 is provided with a recess or aperture 9, adapted to be engaged by the threaded element 8 when the port 5 of the piston 4 is forced downwardly into communication with the channel 2 of the faucet. By this arrangement, it will be noted that the ports 5 and 2 may be held communicating with each other, should it be desired. The lower face of the piston 4 is provided with a reduced cylindrical extension 10, suitably threaded for the reception of a cylindrical extending member 11. The member 11 is provided with a suitable face beyond its threaded aperture engaging the threaded stud or projection 10 of the piston 4, and positioned between this face and the offset or face provided upon the piston 4 by the reduced extension 10 is a suitable washer 12, adapted for tightly engaging the bore of the chamber 3. The chamber 3 is provided upon its lower extremity with an inturned wall or flange 13, and the lower extremity of the member 11 is suitably screw threaded for the reception of a threaded cap or nut 14. Interposed between the offset portion 13 of the chamber 3 and the washer 12 is a helical compression spring normally adapted for closing the passage 2 of the faucet as illustrated in Fig. 1 of the drawings. The upward movement of the piston 4 is limited by the inner face of the cap or nut contacting the offset 13 of the chamber 2.

From the above description, it will be noted that I have provided an extremely simple, and effective self closing faucet, one in which the parts are so arranged as to be readily removed for the insertion of additional washers should they be required, and one wherein means are provided for holding the faucet open should it be desired.

Having thus fully described the invention what is claimed as new is:

1. A faucet having an outlet passage and a transversely arranged chamber communicating with the outlet passage, a piston having a transverse bore within said chamber, reduced threaded extensions upon the piston, a head engaging one of the reduced extensions of the piston, a packing between the head and the piston, an extension engaging the second projection of the piston, a cap upon the projection beyond the lower wall of the chamber, and an expansion spring between the lower wall of the casing and the washer engaged by the extension.

2. A faucet having an outlet passage and a transversely arranged chamber communicating with the outlet passage, said chamber being entirely open at its upper end and having its lower end provided with an annular inwardly extending flange, a piston within the chamber, having a transverse passage and being provided upon both of its ends with reduced threaded projections, a head upon the upper projection, said head being provided with a slit or cut away portion, a washer between the head and the piston engaging the bore of the chamber, a threaded element upon one of the walls of the chamber in a direct line with the cut away portion of the head, an extension engaging the lower reduced portion of the piston, a collar upon the extension engaging the outer face of the flange provided by the chamber, a washer engaging the bore of the chamber between the piston and the extension, and a helical spring engaging the washer and the inner wall of the flange of the chamber.

In testimony whereof I affix my signature in presence of two witnesses.

GEORGE R. HOHMAN.

Witnesses:
 EDWARD L. LATIMER,
 GEORGE C. VOGT.